United States Patent [19]

Orlando et al.

[11] 3,978,571

[45] Sept. 7, 1976

[54] APPARATUS FOR ASSEMBLING STORAGE BATTERY PLATES AND SEPARATORS

[75] Inventors: Daniel Orlando, New Berlin; Chester Misurek, West Allis, both of Wis.

[73] Assignee: Globe-Union Inc., Milwaukee, Wis.

[22] Filed: Apr. 10, 1975

[21] Appl. No.: 566,975

Related U.S. Application Data

[63] Continuation of Ser. No. 516,172, Oct. 21, 1974, abandoned.

[52] U.S. Cl. .............................. 29/204 R; 29/203 L; 29/211 L; 198/421; 214/8.5 K; 221/265
[51] Int. Cl.² ....................................... H01M 2/14
[58] Field of Search........... 29/204 R, 203 L, 211 L; 198/35; 214/8.5 K; 221/263, 264, 265, 224, 93; 136/176

[56] References Cited
UNITED STATES PATENTS

| | | | |
|---|---|---|---|
| 2,639,824 | 5/1953 | Shannon et al. ................. | 214/8.5 K |
| 2,897,950 | 8/1959 | Reed ................................ | 198/35 |
| 2,908,377 | 10/1959 | Winkel et al. ..................... | 198/35 |
| 3,156,340 | 11/1964 | Arkes ................................ | 221/264 |

*Primary Examiner*—Carl E. Hall
*Attorney, Agent, or Firm*—James L. Kirschnik; John Phillip Ryan

[57] ABSTRACT

A machine for forming elements for storage batteries consisting of alternating layers of positive and negative plates and separators. A plurality of homogeneous feed stacks of negative and positive battery plates and separators are supported on a loading platform located above a moving conveyor. Each individual feed stack is supported on a rotatable disc having an aperture formed therein which may be selectively rotated into and out of alignment with a similar aperture formed in the loading platform. Rotation of the discs results in the depositing of a single battery plate or separator from the individual feed stacks onto the conveyor. As the conveyor traverses beneath the loading platform the discs are pivotally cycled to form individual books of alternating plates and separators on the conveyor belt. A ferris wheel type arrangement may be provided for removing the formed books from the conveyor and combining them into battery elements before removal for further processing. Controls are provided for selectively varying the numbers of plates making up the battery elements.

30 Claims, 12 Drawing Figures

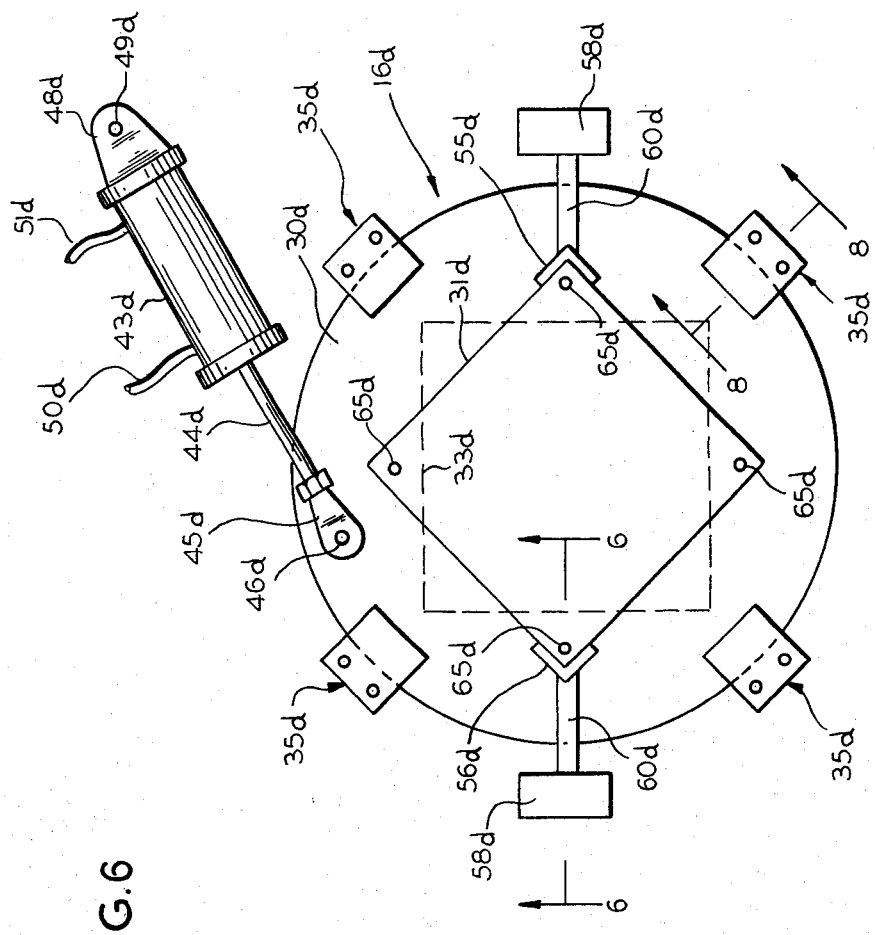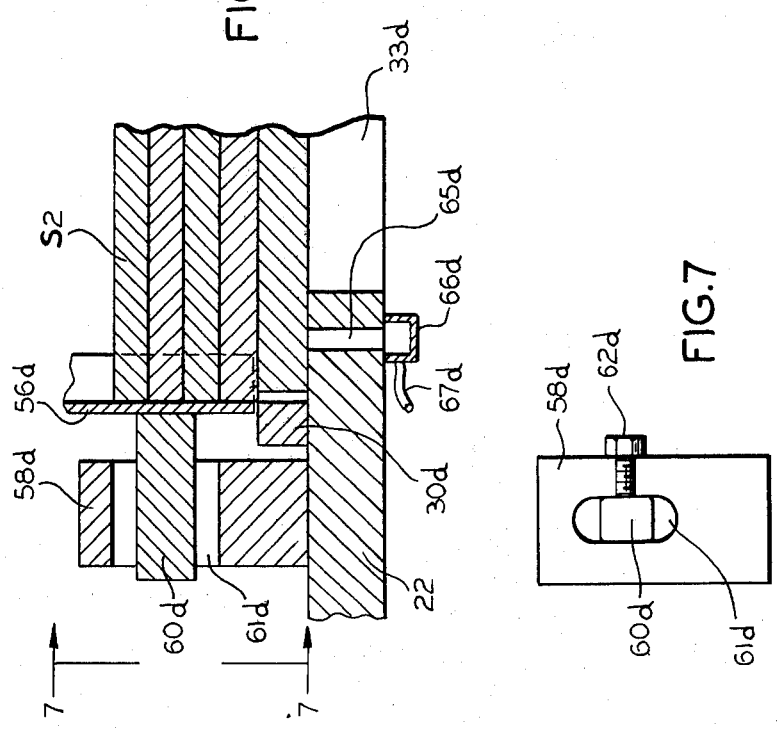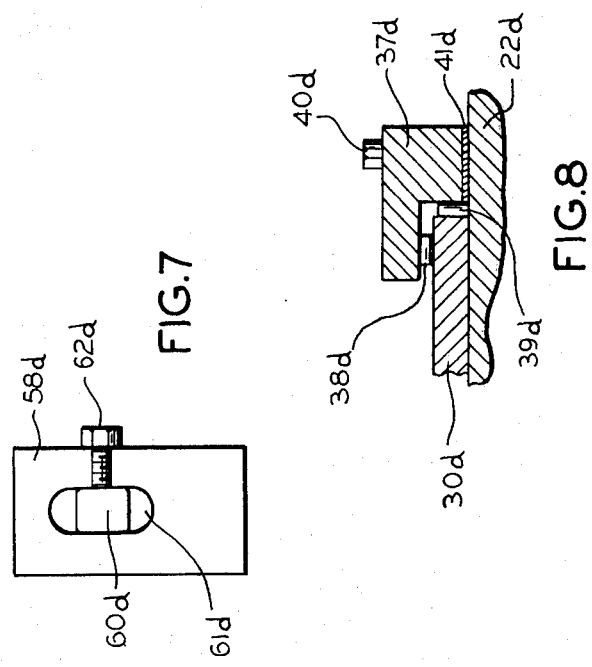

APPARATUS FOR ASSEMBLING STORAGE BATTERY PLATES AND SEPARATORS

This is a continuation of application Ser. No. 516,172, filed Oct. 21, 1974, now abandoned.

BACKGROUND OF THE INVENTION

In the manufacture of storage batteries, particularly lead-acid type storage batteries, one or more elements are provided within a battery case containing electrolyte. The elements generally comprise a plurality of alternately positive and negative battery plates each separated by a sheet of insulating material commonly referred to as separators. The battery plates each typically comprise a relatively fragile supporting grid having a lead paste applied thereto. Conventional practice has been to form the battery elements so as to have one more negative plate than the number of positive plates so that the end most plates of each element are negative plates. The battery elements will thus contain an odd number of plates which may vary from as low as five plates on up to 25 plates depending on the desired capacity of the storage battery.

Various devices have been provided for assembling battery plates and separators into elements automatically to eliminate stacking by hand. Such devices have generally operated in one of two broad catagories. The first catagory utilizes a top lift system as seen in U.S. Pat. No. 2,790,536 issued Apr. 30, 1957, to Reed; and U.S. Pat. No. 2,830,692 issued Apr. 15, 1958 to Winkel. In the top lift arrangement, vacuum type suction devices or mechanical means are usually provided to lift individual battery plates and separators from the tops of feed stacks and arrange then into alternating battery elements. While the top lift system provides for ease in transferring thin, fragile separators and battery plates, movement through relatively large distances is generally required thereby reducing the speed at which systems can operate.

The second catagory of battery element forming apparatus utilize a bottom shuttle system in which individual plates or separators are stripped from the bottoms of stacks of feed stacks and deposited into battery elements. Examples of the shuttle type devices are seen in U.S. Pat. Nos. 2,897,950 issued Aug. 4, 1959 to Reed; 2,624,106 issued Jan. 6, 1953 to Lund; 2,652,933 issued Sept. 22, 1953 to Willard et al; 2,807,227 issued Sept. 24, 1957 to Kerns et al; and 2,908,377 issued Oct. 13, 1959 to Winkel et al. In the shuttle type devices, a pusher plate is generally provided for stripping a battery plate or separator by pushing motion parallel to the plane of the plate or separator. The disadvantage of this type of arrangement rests in the fact that the plate and separators are relatively fragile and are easily buckled during such pushing motion thereby often causing jams and disrupting the stacking process. A further disadvantage of this type of system is that the weight of the remaining members of the feed stack, from which the lower-most element is stripped, bears down upon the moving lower plate resulting in abrasive and frictional forces between the surfaces of the adjacent stationary member and the moving plate or separator. Attempts have been made to reduce such frictional forces, however, the shuttle type systems are generally limited in the speed at which they can be operated.

SUMMARY OF THE INVENTION

The present invention basically comprises an apparatus for forming battery elements of positive and negative battery plates and separator. The apparatus generally includes a loading platform having a plurality of feed stations on which separate feed stacks of positive plates, negative plates, and separators are supported on rotatable discs. Each rotatable disc has an aperture conforming to the configuration of the individual plate or separator and the disc may be rotated to align the aperture with a similar aperture formed in a support platform for depositing individual plates or separators onto a moving conveyor belt. Fixed guides are provided at each station for maintaining the individual feed stacks in a rotatably fixed position over the discs while allowing the feed stacks to move downwardly by gravitational force into contact with the aperture of the rotatable disc. Upon successive reciprocal rotation of the disc, single plates or separators are directed from the bottom of the feed stacks through the apertures in the discs and the apertures in the platform down onto the conveyor to form books of plates and separators which are combined to form elements. Controls are provided for varying the configuration of the various elements formed after removal from the conveyor belt.

It is an object of the invention to provide an improved apparatus for assembling battery elements.

A further object of the invention is to provide an apparatus for assembling battery plates and separators by stripping a plate or separator from the bottom of a feed stack by rotating the lowermost plate or separator relative to the remaining feed stack members.

Another object of the invention is to provide an apparatus stripping battery plates or separators from a feed stack with reduced sliding contact.

Other objects and advantages of the present invention will become more apparent from a detailed description of a preferred embodiment which follows.

BRIEF DESCRIPTION OF THE DRAWINGS

FIG. 5 is a view taken along line 5—5 of FIG. 3;
FIG. 6 is a view taken along line 6—6 of FIG. 5;
FIG. 7 is a view taken along line 7—7 of FIG. 6;
FIG. 8 is a view taken along line 8—8 of FIG. 5.

DESCRIPTION OF A PREFERRED EMBODIMENT

Figure 1:
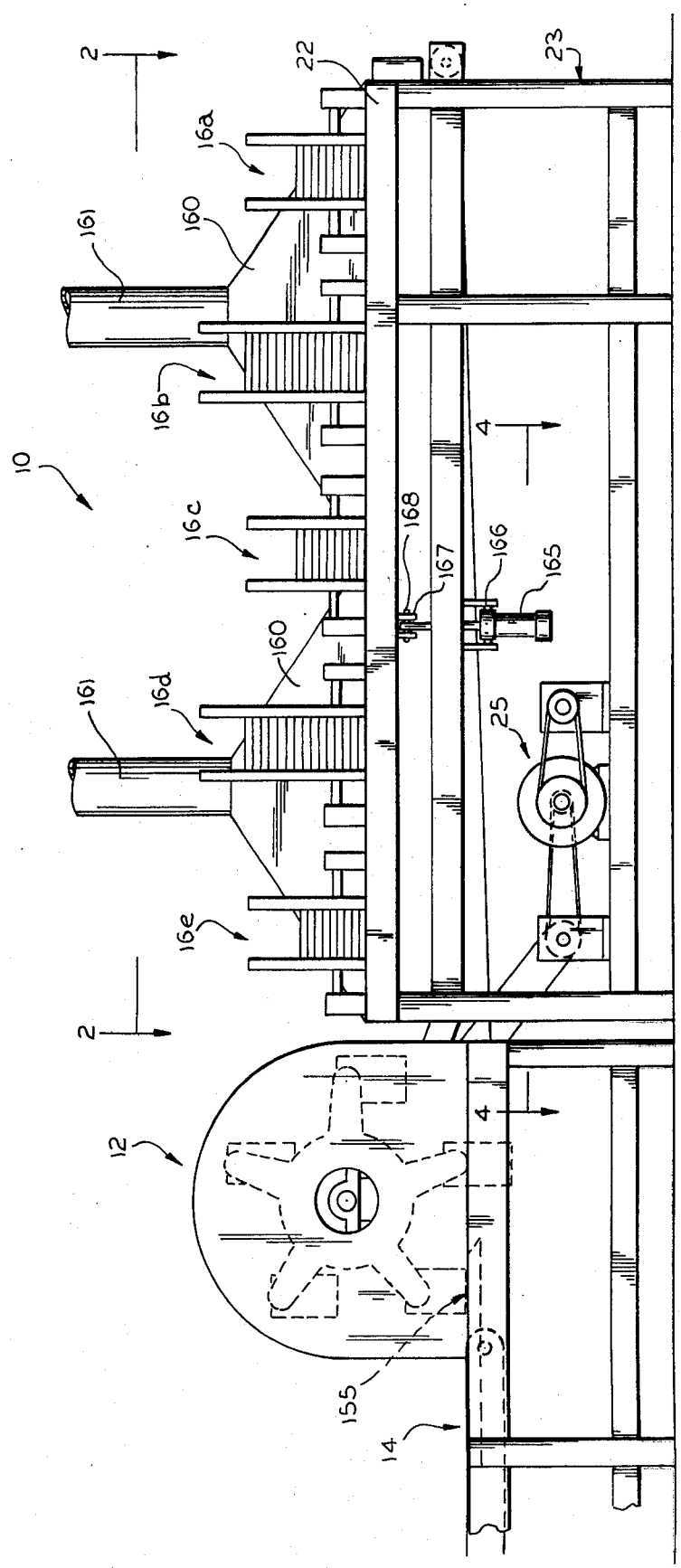
FIG. 1 is a front elevational view of the battery element forming apparatus constructed according to the invention.

As seen in FIG. 1, the battery element forming apparatus comprises a loading station 10 on which individual feed stacks of positive plates, negative plates, and separators are placed for arrangement into elements of alternating plates and separators, a ferris wheel type transfer device 12 for removing books from the leading station 10 and for placing them on an output conveyor unit 14 for removing the elements for further processing.

Figures 2, 3:
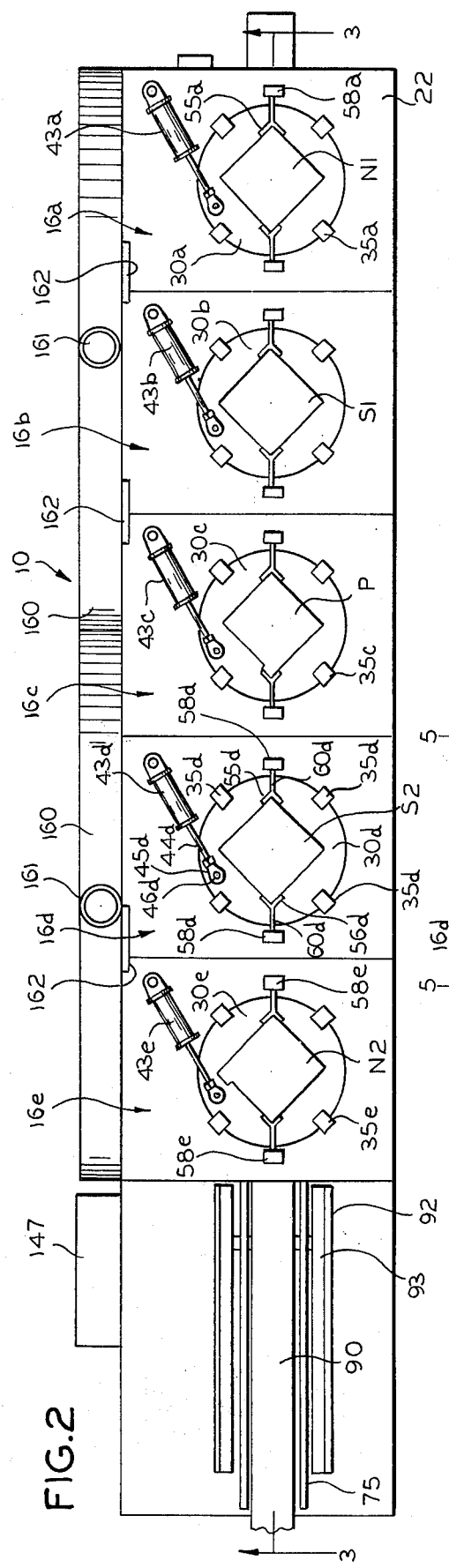
FIG. 2 is a view taken along line 2—2 of FIG. 1.
FIG. 3 is a view taken along line 3—3 of FIG. 2.

With reference to FIGS. 1 through 3, the loading station 10 is seen to comprise a plurality of individual stack feed stations 16a – 16e supported on a base plate 22 which in turn is supported on a suitable framework 23. A dual strand conveyor assembly 24 is supported within the framework 23 beneath the base plate 22 for receiving individual battery plates and separators in a matter to be described hereinafter. A drive assembly 25 is also supported within the framework 23 for providing motive power to the conveyor assembly 24 and other components of the apparatus as will be described later.

Referring generally to FIGS. 1, 2, 3 and 5, the construction of the feed stations 16a through 16e will now be described. Since each of the individual feed stations 16a through 16e are identically constructed, only one need be described in detail, and like parts are designated by like numbers with subscripts a – e as appropriate. Feed station 16d includes a circular disc 30d having a generally rectangular shaped aperture 31d formed in its central portion. The disc 30d is supported on the top of the base plate 22 which has a similarly shaped rectangular aperture 33d formed therein. With particular reference to FIGS. 5 and 8, the plate 30d is rotatably affixed to the top surface of base plate 22 by a plurality of bearing assemblies 35d spaced around the periphery of disc 30d. Each bearing assembly 35d may consist of generally L-shaped bracket 37d having one leg extending in spaced relationship above the edge of the upper surface of plate 30d. One or more rollers 38d may be provided between the bracket extension and the top surface of disc 30d for rollably engaging the upper surface of disc 30d. Similar rollers 39d may be provided between the peripheral edge of disc 30d and a downwardly extending inner portion of bracket 37d. Bracket 37d may be secured to the base plate 22 by conventional means such as bolts 40d. Adjusting shims 41d may be provided between the adjoining surfaces of bracket 37d and base plate 22 for adjusting the bearing load of bearings 38d. It will thus be seen that the disc 30d is vertically and horizontally fixed relative to base plate 22 by the bearing assemblies 35d, but the disc 30d is free to rotate within the confines of bearing 35d. Thus, the disc 30d can be rotated to position aperture 31d into and out of alignment with aperture 33d formed in the base plate 22. The rotation of disc 30d may be provided by a double acting fluid cylinder 43d which extends generally horizontally along the upper surface of base plate 22. Cylinder 43d may include an extensible shaft 44d having a clevis 45d which is pivotally connected to a pivot pin 46d extending from the plate 30d. The opposite end of cylinder 43d may have a clevis 48d secured to a pin 49d fixed to base plate 22. Cylinder 43d may be of any suitable fluid actuated type such as air or hydraulic and has a pair of fluid conducting lines 50d and 51d connected thereto in a conventional manner for actuating cylinder 43. Lines 50d and 51d may be coupled to a suitable source of pressurized fluid (not shown).

As shown in FIGS. 5, 6 and 7, feed station 16d also includes a pair of spaced, vertically extending angle brackets 55d and 56d which engage diametrically opposed corners of a stack of separators S2. Angle brackets 55d and 56d are each supported by a block 58d attached to base plate 22 outside the confines disc 30. Generally horizontally extending rods 60d may be attached to each of the angle brackets 55d and 56d and the rods 60d may extend through apertures 61d formed in blocks 58d. An adjusting screw 62d will be provided in the side of each block 58d in communication with the aperture 61d for frictionally engaging rod member 60d for adjusting the vertical and horizontal positions of angle brackets 55d and 56d. Brackets 55d and 56d are each adjusted horizontally to slidingly engage the opposed corners of the horizontal stack of separators 52, and are vertically adjusted to provide a small clearance space between the lower portion of the brackets 55d and 56d and the upper surface of disc 30d.

As seen in FIGS. 5 and 6, when the aperture 31d of disc 30d is positioned so as to aline the opposite corners of aperture 31d with the position of the stack of separators S2, the lower-most member of the stack will be guided by brackets 55d and 56d into the aperture 31d of disc 30d. Further motion of the stack members will be limited by engagement of the lower-most member with the upper surface of base plate 22. The thickness of disc 30d in the region beneath brackets 55d and 56d will be approximately equal to the thickness of the separators S2 so that only one separator will be contained within aperture 31d of disc 30d. The periphery of the disc 30d may have increased thickness if necessary to reduce warping or deflection of the disc during rotation. To further influence the downward motion of the lower-most separator member, a plurality of apertures 65d are provided in base plate 22 at a position in alignment with the corners of the stack of separators S2 such that the apertures 65d are exposed within aperture 31d when disc 30d is positioned to align the aperture 31d with the separators S2. A manifold 66d is provided along the bottom portion of plate 22 and extends around the exterior of aperture 33d formed in the base plate 22 and has its interior communicating with each of the apertures 65d. A suitable high vacuum line 67d may connect the interior of manifold 66d with a suitable source of vacuum thereby creating a suction at each of the apertures 65d tending to draw the lower-most separator S2 downwardly into aperture 31d of disc 30d.

From the foregoing description, it will be appreciated that when cylinder 43d is actuated to position disc 30d with its aperture 31d in general alignment with the stack of separators S2, the lower-most separator will be drawn both by gravity and vacuum into the aperture 31d of the disc 30d with further motion of the separator limited by support of its corners on the exposed portions of base plate 22. Actuation of the cylinder 43d to rotate disc 30d so as to position aperture 31d in alignment with aperture 33d will result in the pivoting of the lower-most separator S2 contained within aperture 31d into alignment with aperture 33d of the base plate 22. The separator will then fall through aperture 33d of base plate 22 under the influence of gravity alone. Rotation of the disc 30d will also result in closure of the vacuum apertures 65d by moving aperture 31d out of position over the apertures 65d. It will also be appreciated that the angle brackets 55d and 56d will restrain the remaining separator stack members S2 from pivotal motion with disc 30 thereby effectively resulting in a stripping of the bottom separator S2 from the stack with ultimate deposit through aperture 33d of the base plate 22. Recycling of the cylinder 43d and disc 30d will provide a similar stripping action as to the remaining separators S2. It will also be apparent that the amount of sliding contact between the pivoting lowermost separator and the adjacent separator is significantly less than that present in conventional shuttle type systems.

As seen in FIGS. 1 through 3, the separate feed stations 16a through 16e are arranged in a line along the top of base plate 22 and each contain a stack of similar battery plates or separators. Station 16a is provided with a stack of negative plates designated as N1, station 16b contains separators designated as S1, station 16c contains positive plates designated as P, station 16d contains separators designated as S2, and station 16e contains a stack of negative plates designated as N2. Each of the feed stations is constructed in a manner similar to that of feed station 16d with the exception that the battery plates at stations 16a, 16c and 16e are of generally sufficient mass to enable the elimination of vacuum apertures 65d, manifold 66d and vacuum line 67d provided for the separators which are generally made of a light weight sheet material.

Figure 9:
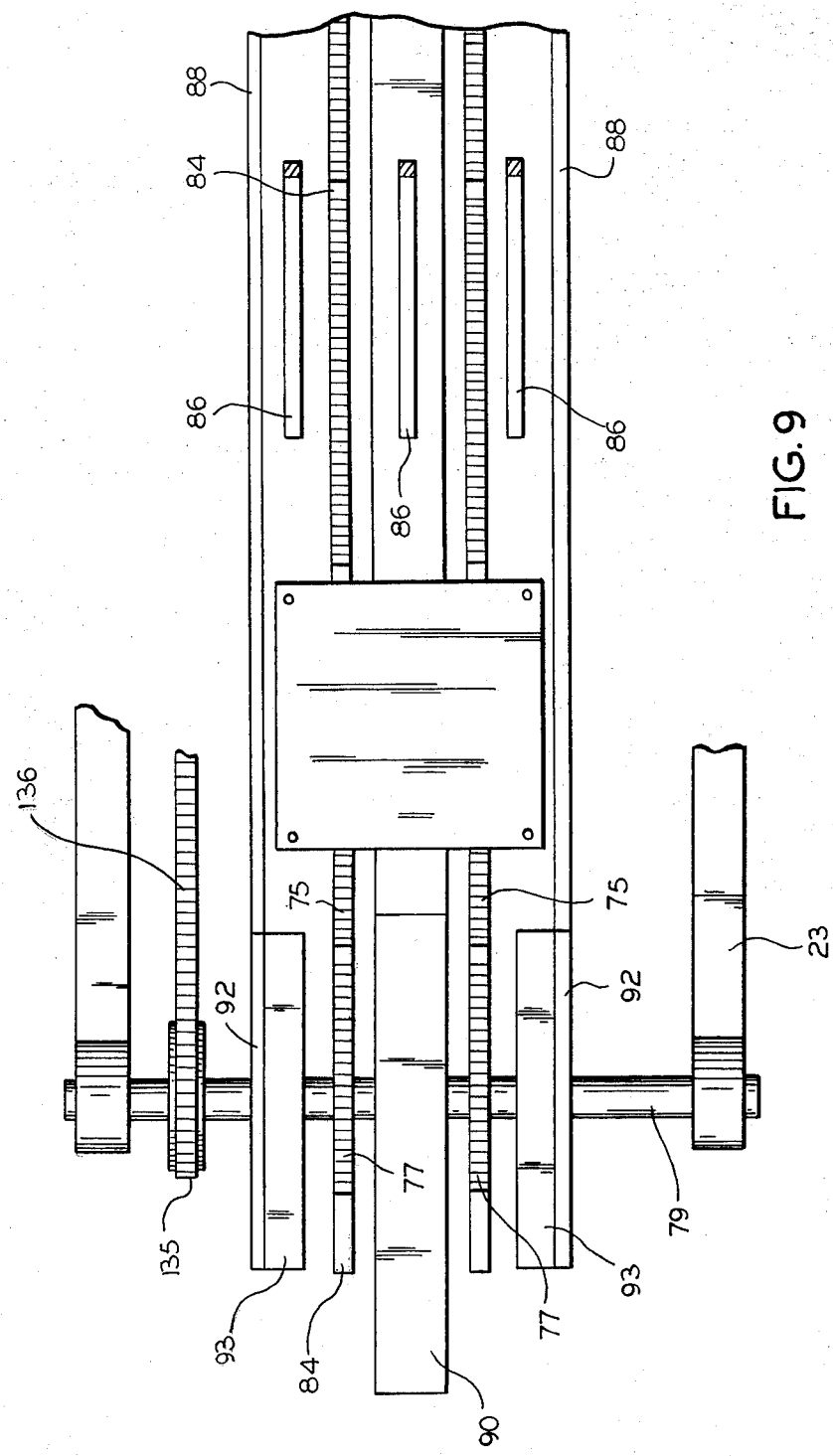
FIG. 9 is a view taken along line 9—9 of FIG. 3.

Conveyor assembly 24 is located beneath the base plate 22 within framework 23 for gathering books of plates and separators and is best seen in FIGS. 3 and 9. Conveyor assembly 24 generally comprises a pair of parallel endless chains 75 which are arranged to have a substantially horizontally extending run beneath the base plate 22 of the loading station 10. The opposite ends of the parallel chains 75 are supported on a first pair of sprockets 76 located at the end of base plate 22 adjacent station 16a, and a second pair of sprockets 77 located at the opposite end of the loading station 10. Sprocket pairs 76 and 77 may be supported on horizontal shafts 76 and 79 respectively which may be journaled in bearings (not shown) in any conventional manner. A third sprocket pair 80 may be similarly journaled on a shaft 81 beneath the upper run of chains 75 and may be adjustable vertically in any conventional manner for adjusting the tension of the chains 75. The sprocket pairs on each of the shafts 78, 79 and 81 are keyed or fixed to their respective shafts so that they rotate in unison. Each of the chain members 75 has a plurality of spaced outwardly extending dogs 84 affixed thereto. The dogs are uniformly spaced along each chain 75 and are parallel to the dogs of the mating chain 75. As best seen in FIG. 3, the spacing of the dogs is such as to encompass the approximate distance between each of the feed stations 16a through 16e so that as plates or separators from stations 16a through 16e are dropped through apertures 33a through 33e in the base plate 22, they are deposited on the chains 75 between a pair of dogs 84 to form books of alternating layers of plates and separators. As seen in FIGS. 3 and 9, beneath each of the apertures 33a, 33c, and 33e of feed stations 16a, 16c, and 16e, three parallel, spaced and generally horizontally extending tines 86 are located. The upstream ends of each of the tines 86 has an upwardly extending portion which is attached in any suitable manner to the bottom of base plate 22. Each of the sets of tines 86 extends beneath the feed stations 16a, 16c and 16e to catch the relatively fragile negative or positive battery plates N1, N2 or P. The position of the tines 86 is such that dogs 84 moving with chains 75 pass between the outer and inner tine projections and strip the deposited battery plates off the tines whereby the plates then drop down unto the conveyor chains 75 between the respective dogs 84. A pair of spaced vertical guidewalls 88 also extend beneath the base plate 22 on either side of the chains 75 and prevent lateral motion of the stacked plates off of the chains 75. As the conveyor chains 75 move downstream and pass beneath the final feed station 16e, an upwardly inclined ramp 90 is provided which extends between chains 75. As the dogs 84 push the books along the chains 75, the books will be pushed upwardly along the inclined ramp 90 to the point where the upper extremeties of the dogs 84 pass beneath the line of intersection of ramp 90 whereby the books are stationarily supported on ramp 90 for pickup by ferris wheel assembly 12 as will be described hereinafter. A pair of inclined vertical guidewalls 92 may be provided on either side of the inclined ramp 90 and chains 75 exteriorly of the support plate 22. The guide plates 92 may also each include an inclined portion 93 which may extend parallel to inclined ramp 90, however, both the guide plates 92 and the adjoining portions 93 terminate at a point prior to the final resting position of the books on the inclined ramp 90 to provide clearance for the ferris wheel assembly 12.

As is also seen in FIG. 3, downwardly extending leaf springs 95 may be provided beneath plate 22 adjacent the downstream ends of stations 16b and 16d. The leaf springs 95 are pivotally attached to the plate 22 by any suitable means such as pivot pins 96, and tension springs 97 may be attached between the bottom of plate 22 and a portion of leaf springs 95, to resiliently urge the springs 95 into an approximately vertically downwardly extending position. As seen in FIG. 3, the springs 95 will act upon the forward edge of the separators S1 and S2 and urge the rearwardly into contact with the following dog 84 on chains 75 thereby insuring alignment of the separators and plates of the books on the chains 75. The leaf members 95 need not be provided at the battery plate feed station since the battery plates are stripped from the tines 87 by dogs 84 and will be in general alignment with the edge of the trailing dog 84 on chain 75. As is also seen in FIG. 3, beneath the stations 16a through 16e and also beneath chains 75, an open topped generally rectangular chamber 100 is located for receiving particles of battery paste and other foreign matter which might drop down from the chain 75. To facilitate removal of such foreign matter, especially the battery dust which can be harmful to workers if inhaled, a vacuum tube 101 is attached at one or more locations along the bottom of the chamber 100 for drawing the loose particles out of the chamber 100 and away from the apparatus. The vacuum tube 101 may be connected to any suitable source of vacuum in a conventional and well known manner. Additionally, a photoelectric eve 102 is mounted on one end of the loading station 10 and an aligned reflector 103 on the opposite end is provided for detecting jams or misaligned plates beneath the base plate 22.

Figure 4:
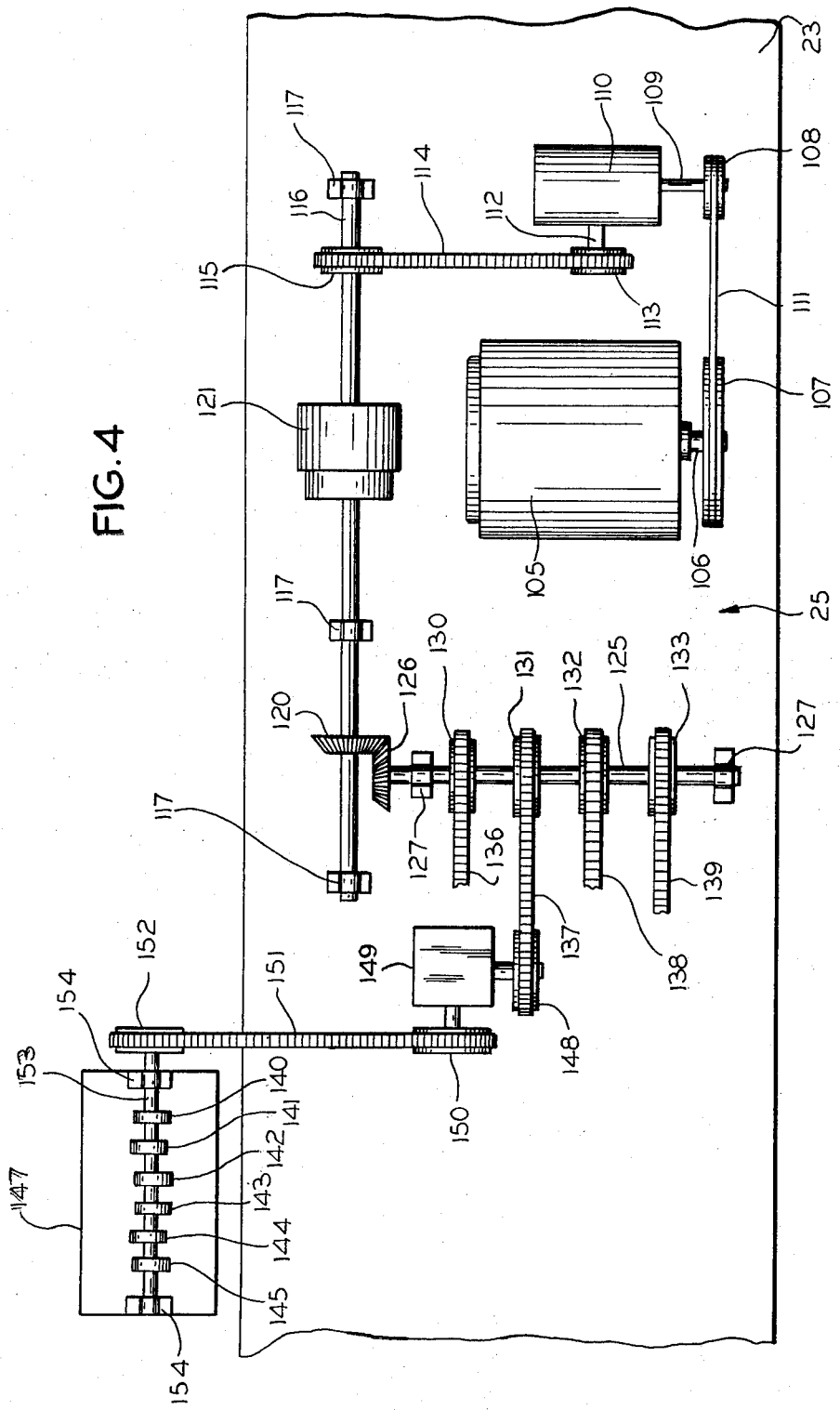
FIG. 4 is a view taken along line 4—4 of FIG. 1.

The drive apparatus 25 is seen in FIGS. 3 and 4 and includes a prime mover for providing power to turn the conveyor chains 75 and other parts of the system to be decribed hereinafter. The prime mover is supported on the framework 23 and may be any conventional motive means such as an electric motor 105. The motor 105 has an output shaft 106 with a pulley 107 attached thereto which drives a pulley 108 attached to shaft 109 of a gear reducer unit 110 by means of a drive belt 111. The output shaft 112 of reducer 110 has a sprocket 113 attached thereto and a chain 114 couples sprocket 113 to a second sprocket 115 attached to a power shaft 116. Power shaft 116 extends generally horizontally along framework 23 and may be suitably journaled for rotation in bearings 117. A drive gear 120 is attached to shaft 116 for rotation therewith, and a clutch unit 121 is provided in shaft 116 between sprocket 115 and drive gear 120 for selectively engaging and disengaging the drive motor 105 with drive gear 120. A power output shaft 125 is coupled to output gear 120 by means of a mating gear 126, and shaft 125 may also be suitably journaled in bearings 127. A plurality of sprockets 130-133 are affixed to shaft 125 for providing power to the apparatus in a manner to be described hereinafter. Sprocket 130 is coupled to a drive sprocket 135 attached to shaft 79 of the conveyor belt 75 by means of a drive chain 136. Similarly, sprockets 131-133 are each associated with drive chains 137-139 respectively.

Drive chain 137 drives a series of cams 140-145 contained in a control box 147. The drive chain 137 engages a sprocket 148 attached to a right angle gear drive 149 whose output sprocket 150 is coupled by a drive chain 151 with a sprocket 152 attached to cam shaft 153 to which cams 140-145 are attached. Cam shaft 153 may be rotatably journaled in bearings 154 within the control box 147. Each of the cams 140-145 actuate a corresponding switch (not shown) for controlling the apparatus in a manner which will be described hereinafter.

Drive chains 138 and 139 are adapted to drive the ferris wheel assembly 12 and output conveyor 14 respectively. Ferris wheel assembly 12 and output conveyor 14 are depicted generally in FIG. 1. In the preferred embodiment, the ferris wheel 12 and output conveyor 14 are similar to those described in U.S. Pat. No. 2,897,950 to L. G. Reed, issued on Aug. 4, 1959. The ferris wheel 12 and output conveyor 14 are thus well known to those skilled in the art and need not be described in detail. It will suffice to say that the ferris wheel 12 is adapted to pick up the hooks from inclined ramp 90 shown in FIG. 3 and transfer them to a holding station 155 adjacent output conveyor 14. The ferris wheel may be adapted to form the books into elements at the holding station 155 prior to transfer to the moving conveyor belt (not shown) of the output conveyor apparatus 14 for further processing. Other suitable transfer mechanisms could be utilized with the invention as will be apparent to those skilled in the art.

As seen in FIGS. 1 and 2, a pair of vacuum plenum chambers 160 are provided along the edge of base plate 22. The chambers 160 may have exhaust ducts 161 which may be connected to the suction side of a vacuum pump (not shown) in any conventional manner. The plenum chambers 160 may have intake ports 162 formed therein adjacent the upper surface of plate 22 for drawing away any loose particles of battery paste and other foreign matter. Finally, a hydraulic lift cylinder 165 may be provided for raising and lowering base plate 22 for maintenance and to provide access to conveyor chains 75 for clearing jams. The cylinder may be pivotally attached to frame 23 by pins 166 and an extensible shaft 167 may be pivotally attached to base plate 22 by a pin 168. Any conventional source of pressurized fluid may be provided for selectively actuating cylinder 165, and plate 22 may be hinged at its rear edge for pivotally raising and lowering plate 22.

As previously mentioned, conventional practice in the battery making field has been to form battery elements having one more negative plate than the number of positive plates. Therefore, assuming a nine plate battery element is to be produced on the apparatus according to the invention, the element will be composed of four books. Each of three books will consist of a negative plate N1, a separator S1, a positive plate P, and a separator S2. The fourth book will include the same plate arrangement plus an additional N2 negative plate on the top of the book. The first three books are formed on the loading station 10 and are then transferred by the ferris wheel assembly 12 to the holding station 155 of the output conveyor apparatus 14 where they are combined. The fourth book containing the extra N2 negative plate, when added to the three previously combined books, forms a complete 9 plate element having negative plates on the top and bottom and alternating negative and positive plates separated by separators.

Figures 10, 11:
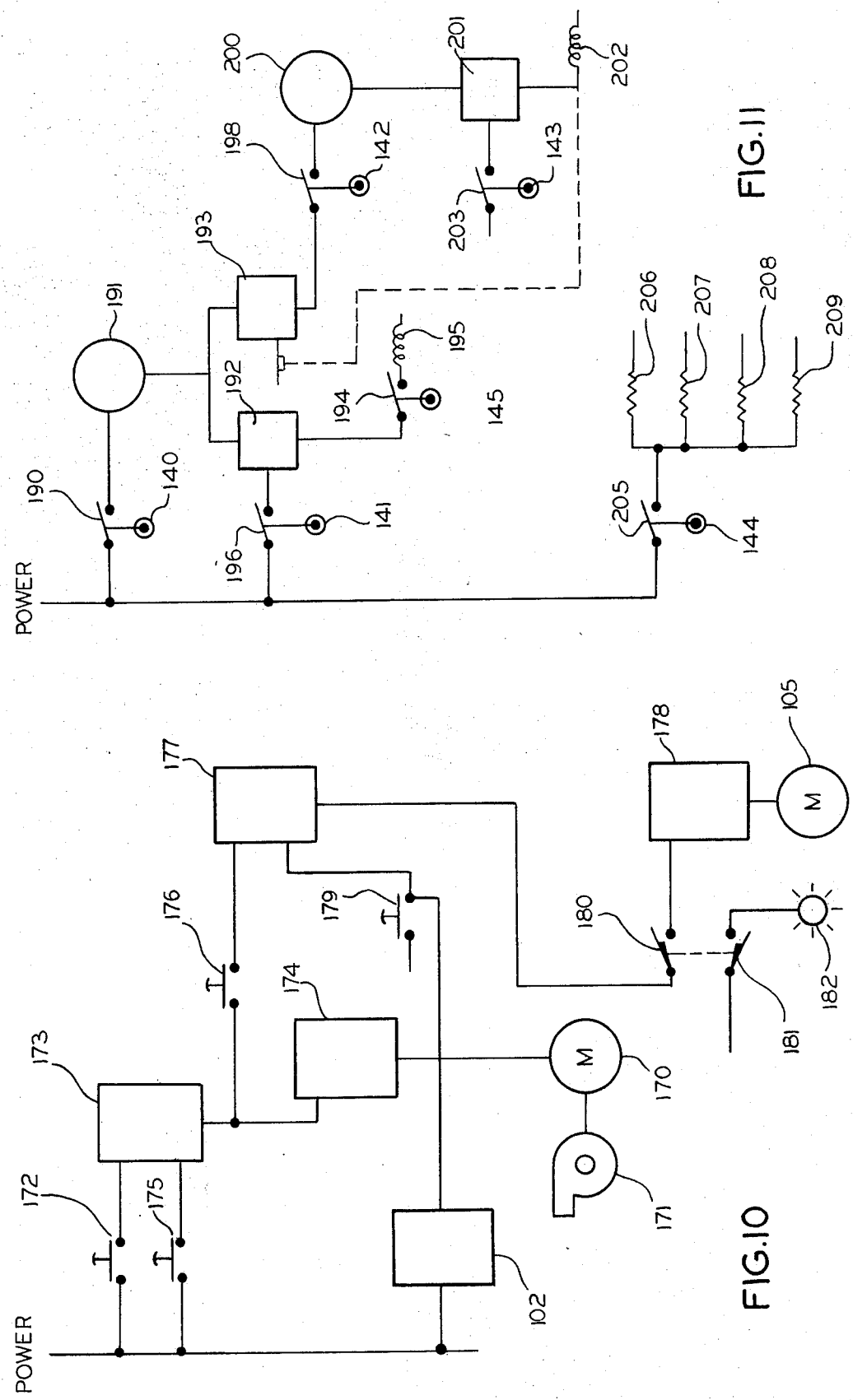
FIG. 10 is an electric schematic of the power supply of the invention.
FIG. 11 is an electrical schematic of the control system for controlling the number and arrangement of elements formed on the apparatus.
Figure 12:
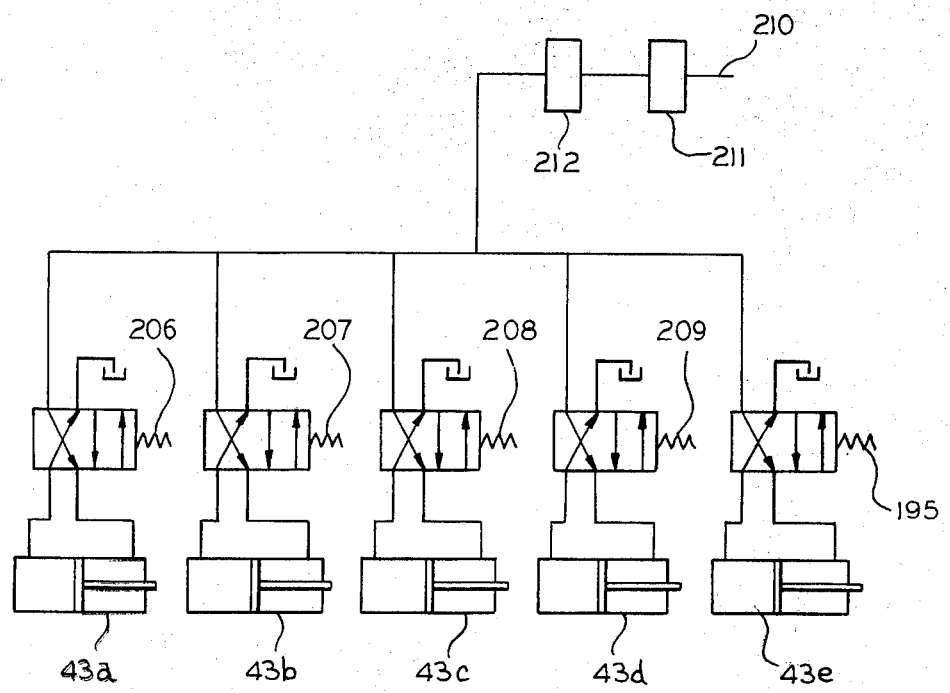
FIG. 12 is a schematic depiction of the control system for pivoting the discs at the individual loading station.

The controls necessary for enabling the present invention to function in the manner just described are schematically depicted in FIGS. 10 through 12. FIG. 10 schematically depicts the circuits for the drive motor 105 and a motor 170 for driving a vacuum pump 171. A start switch 172 is provided for activating a motor start relay 173 coupled to start up circuit 174 of the motor 170. A stop switch 175 is also provided for manually resetting the relay 173 to stop the motor 170. The second start switch 176 receives power only when relay 173 is activated and is coupled to a start relay 177 coupled to start circuit 178 of the mechanical drive motor 105. Relay 177 may be reset to a stop position by either stop switch 179 or by a signal from photocell 102 in the event of a jam on the conveyor chains 75. Drive motor 105 may also be stopped by action of a limit switch 180 which may be coupled to the conveyor assembly 14 and which is activated when the conveyor is full to prevent an excessive build up of elements on the conveyor 14. Limit switch 180 may be coupled to a switch 181 which closes when switch 180 opens to activate an indicator light 182 for visually indicating that the conveyor 14 is full.

FIG. 11 schematically depicts the control circuit for controlling the number of books contained in an element formed on the conveyor holding station 155 of output conveyor assembly 14. The circuit is controlled by cams 140-145 contained in the control box 147 which are driven by the drive motor 105. Cam 140 acts upon a switch 190 to provide impulse signals to a first counter 191. The first counter 191 may have a manual selector, not shown, for providing an output pulse after a predetermined number of impulses from the switch 190. The output pulse from the first counter 191 activates a pair of relays 192 and 193. Activation of relay 192 permits cam 145 to activate a switch 194 for energizing a solenoid 195 for controlling the depositing of the N2 negative plates on the conveyor 75. As soon as cam 145 activates switch 194, cam 141 acts upon a switch 196 which resets the relay 192. Relay 193 when activated permits switch 198 which is activated by cam 142 to provide input pulses to a second counter 200 which controls the timing of the transfer of elements from the holding station 155 to output conveyor assembly 14 after a completed element is formed. The counter 200 after a predetermined number of input impulses, sends an output pulse to relay 201 which energizes a transfer control mechanism 202 to initiate transfer of the elements from the holding station 155 to the output conveyor 14. Shortly thereafter, cam 143 activates a switch 203 which resets relay 201. During the foregoing functions, cam 144 controls a switch 205 which energizes solenoids 206-209 which in turn control the depositing of N1 negative plates, positive plates P, and separator elements S1 and S2 from stations 16a through 16d.

Referring now to FIG. 12, the control system for cylinders 43a–43e which activate discs 30a–30e and control the depositing of separator plates and battery plates on the conveyor chains 75 is shown. Solenoids 206–209, when activated or deactivated by cam 144 and switch 205, direct pressurized fluid from a source 210 to one of the two ends of the cylinders 43a through 43d for pivoting disc plates 30a through 30d. The fluid could be air or hydraulic fluid or any other suitable fluid and may be directed into the cylinders through a filter 211 and an oiler 212 in the event the fluid is compressed air. Cylinder 43e is activated by solenoid 195 through 145 and switch 194 in a similar manner to control the deposition of the N2 negative plates on the conveyor chains 75 at the appropriate time.

OPERATION OF THE INVENTION

Having described the physical arrangement of components of the apparatus according to the invention, the operation of the device will now be described. For the sake of illustration, it will be assumed that a nine plate battery element is to be formed. Such an element would contain five negative plates and four positive plates all separated by nonconductive separators. Thus, each battery element would consist of four books of plates and separators with the additional inclusion of one N2 plate in the final book. The first counter 191 is thus set to produce an output pulse after four counts from switch 190. Second counter 200 is set to deliver an output pulse after three complete books plus the fourth book containing the extra negative plate are deposited on the holding station 155 adjacent output conveyor assembly 14. The setting of counter 200 will depend upon the number of pickup arms contained in the ferris wheel assembly 12. For example, if the ferris wheel contains six arms, counter 200 would be activated, after each two-thirds of a revolution of the ferris wheel 12.

After setting the counters 191 and 200, switch 172 is closed to start the blower motor 170 and switch 176 is closed to start the conveyor drive motor 105. Clutch 121 is then engaged to connect the drive motor 105 through power shaft 116 to shaft 125 carrying the drive sprocket 130 through 133 thereby driving the conveyor chains 75, the ferris wheel assembly 12, the conveyor assembly 14, and the timing cams 140–145 mounted on shaft 153. As cam shaft 153 rotates, solenoids 206–209 are energized thereby actuating cylinders 43a through 43d for simultaneously depositing the N1, S1, P and S2 elements on conveyor belt 75. As conveyor chains 75 move beneath base plate 22, the books will be formed as illustrated in FIG. 3 progressively obtaining a negative plate, a separator S1, a positive plate and a separator S2. At the fourth count, counter 191 will activate relay 192 which will be activated by cam 145 to deposit an N2 negative plate on top of the fourth book. The books will be successively driven by conveyor chain 75 up the ramp 90 where they will be successively picked up by the ferris wheel assembly 12 and deposited at the holding station adjacent conveyor 14 until the requisite number of books are deposited to form a completed element. After the required number of books have been placed at the holding station, the second counter 200 activates relay 201 which will in turn activate the transfer mechanism 202 for transferring the completed element onto output conveyor assembly 14 for further processing. It will be appreciated that photocell 102 will automatically stop the conveyor drive motor 105 in the event of any fouling beneath the base plate 22 of loading station 10. To clear a jam, cylinder 165 may be activated to pivotally lift the base plate 22 to provide access to the interior of the loading station 10.

The present apparatus has been found to be operable at stacking rates approximately twice as fast as conventional stackers for battery plates. While one embodiment of the invention has thus been described, it will be appreciated by those skilled in the art that other variations are possible without departing from the nature of the invention. Accordingly, the invention is not to be limited by the foregoing description but is to be taken solely by an interpretation of the claims which follow.

We claim:
1. Apparatus for arranging storage battery plates and separators into battery elements, comprising:
   loading station means including a plurality of feed means for dispensing battery plates and separators,
   conveyor means for receiving said plates and separators from said feed means,
   at least one of said feed means comprising a pivotable disc having a first aperture formed therein, and bracket means for maintaining a stack of plates or separators in a horizontally fixed position over said disc and said first aperture, said disc being pivotable between a first position in which said first aperture is aligned with the lower-most member of said stack, and a second position wherein said lower-most member is deposited on said conveyor, means for limiting vertical movement of said stack when said disc is in said first position to permit only the lower-most member of said stack to be received in said aperture.
2. Apparatus as recited in claim 1, including:
   bearing means for restricting horizontal and vertical motion of said pivotable disc, and
   means for pivoting said disc between said first and second positions.
3. Apparatus as recited in claim 2, wherein said means for pivoting said disc comprises a fluid actuated cylinder.
4. Apparatus as recited in claim 3 wherein:
   said means for limiting vertical movement of said stack comprise base means supporting said feed means, said base means having a second aperture formed therein in a position substantially in alignment with said first aperture when said disc is in said second position whereby said stack is restrained from vertical movement by said base means when said disc is in said first position, and said lower-most member will drop through said first and second apertures when said disc is in said second position to be deposited on said conveyor means.
5. Apparatus as recited in claim 4 including:
   third apertures formed in said base plate in general alignment with the corners of said first aperture when said disc is in said first position;
   means for coupling a source of vacuum to said third apertures for urging said lower-most member into said first aperture when said disc is in said first position;
   said third apertures being covered by said disc in said second position.
6. Apparatus as recited in claim 5 wherein:

said bracket means comprise at least two spaced upstanding members slidably engaging the edges of said stack said upstanding members being fixedly mounted relative to said disc; and means for adjusting the vertical and horizontal position of said upstanding members.

7. Apparatus as recited in claim 6 including:

control means for sequentially depositing said plates and separators onto said conveyor to form books of alternating plates and separators.

8. Apparatus as recited in claim 7 wherein:

said feed means are arranged to alternately contain stacks at negative battery plates, separators, and positive battery plates.

9. Apparatus as recited in claim 8 including:

at least five feed means arranged in general alignment with the direction of movement of said conveyor, said feed means, commending with the upstream end of said loading station, containing stacks of negative plates, separators, positive plates, separators and negative plates respectively.

10. Apparatus as recited in claim 9 wherein:

said control means including means for simultaneously activating the four upstream feed means; and first counter means for activating the downstream feed means after a predetermined number of books have been formed on said conveyor.

11. Apparatus as recited in claim 10 wherein said control means include cam means for activating solenoids coupled to each of said fluid cylinders, said solenoids being arranged to direct fluid to said cylinders.

12. Apparatus as recited in claim 11 including:

means for removing books from said conveyor means and combining them to form battery elements, and said control means including second counter means for controlling the number of books contained in said battery elements, and means for resetting said control means after a predetermined cycle of operation.

13. Apparatus as recited in claim 1 wherein:

said means for limiting vertical movement of said stack comprise base means supporting said feed means, said base means having a second aperture formed therein in a position substantially in alignment with said first aperture when said disc is in said second position whereby said stack is restrained from vertical movement by said base means when said disc is in said first position, and said lower-most member will drop through said first and second apertures when said disc is in said second position to be deposited on said conveyor means.

14. Apparatus as recited in claim 13 including:

third apertures formed in said base plate in general alignment with the corners of said first aperture when said disc is in said first position;

means for coupling a source of vacuum to said third apertures for urging said lower-most member into said first aperture when said disc is in said first position;

said third apertures being covered by said disc in said second position.

15. Apparatus as recited in claim 1 wherein:

said bracket means comprise at least two spaced upstanding members slidably engaging the edges of said stack, said upstanding members being fixedly mounted relative to said disc; and means for adjusting the vertical and horizontal position of said upstanding members.

16. Apparatus as recited in claim 1 including:

control means for sequentially deposition said plates and separators onto said conveyor to form books of alternating plates and separators.

17. Apparatus as recited in claim 16 wherein:

said feed means are arranged to alternately contain stacks of negative battery plates, separators, and positive battery plates.

18. Apparatus as recited in claim 17 including:

at least five feed means arranged in general alignment with the direction of movement of said conveyor, said feed means, commending with the upstream end of said loading station, containing stacks of negative plates, separators, positive plates, separators and negative plates respectively.

19. Apparatus as recited in claim 18 wherein:

said control means including means for simultaneously activating the four upstream feed means; and first counter means for activating the downstream feed means after a predetermined number of books have been formed on said conveyor.

20. Apparatus as recited in claim 19 wherein said control means include cam means for activating solenoids coupled to each of said fluid cylinders, said solenoids being arranged to direct fluid to said cylinders.

21. Apparatus as recited in claim 20 including:

means for removing books from said conveyor means and combining them to form battery elements, and said control means including second counter means for controlling the number of books contained in said battery elements, and means for resetting said control means after a predetermined cycle of operation.

22. Apparatus for arranging storage battery plates and separators into battery elements, comprising:

loading station means including a plurality of feed means for dispensing battery plates and separators;

means for receiving said plates and separators from said feed means;

at least one of said feed means comprising means for maintaining a stack of plates or separators in a horizontally fixed position over said receiving means, means for pivoting the lowermost member of said stack between a first position in alignment with the remaining stack members and a second position, and means for permitting said lower-most member to be deposited on said receiving means from said second position.

23. Apparatus as recited in claim 22 wherein said pivoting means has a first aperture formed therein for receiving the lower-most member of said stack in said first position.

24. Apparatus as recited in claim 23 wherein said means for permitting said lower-most member to be deposited on said receiving means from said second position comprises base means supporting said feed means, said base means having a second aperture formed therein in a position substantially in alignment with said first aperture when said pivoting means is in said second position.

25. Apparatus as recited in claim 24 including bearing means for restricting horizontal and vertical motion of said pivoting means.

26. Apparatus as recited in claim 25 wherein said receiving means comprises conveyor means.

27. Feed apparatus for dispensing battery plates or separators from a stack, said apparatus comprising:
 plate means having a first aperture formed therein, said plate means having a thickness no greater than the individual battery plates or separators to be dispensed;
 base means supporting said plate means, said base means having a second aperture formed therein;
 bracket means for slidably engaging opposed edges of said stack, said bracket means being affixed to said base means and including means for vertically and horizontally adjusting the position of said bracket means, said bracket means being disposed above said plate means and arranged to position said stack angularly out of alignment with said second aperture;
 means for pivoting said plate means between a first position where said first aperture is aligned with said stack, and a second position where said first aperture is aligned with said second aperture.

28. Feed apparatus as recited in claim 27 including:
 vacuum means for urging the lower-most member of said stack downwardly into said first aperture when said plate means is in said first position.

29. Feed apparatus as recited in claim 27 wherein:
 said plate means being thicker along its periphery than in the vicinity of said first aperture for strengthening said plate means.

30. Feed apparatus as recited in claim 27 wherein said plate means comprises disc means, and including bearing means for restricting horizontal and vertical motion of said disc means.

* * * * *

UNITED STATES PATENT AND TRADEMARK OFFICE
CERTIFICATE OF CORRECTION

PATENT NO. : 3,978,571
DATED : September 7, 1976
INVENTOR(S) : Daniel Orlando et al It is certified that error appears in the above-identified patent and that said Letters Patent are hereby corrected as shown below:

Column 1, line 16, "conventional" should be -- Conventional --

Column 1, line 56, "plate" should be -- plates --

Column 2, line 68, "leading" should be -- loading --

Column 4, line 10, "52" should be -- S2 --

Column 5, line 32, "76" should be -- 78 --

Column 6, line 30, "the" should be -- them --

Column 6, line 50, "eve" should be -- eye --

Column 7, line 36, "hooks" should be -- books --

Column 9, line 15, after "through" insert -- cam --

Claim 16, line 2, "deposition" should be -- depositing --

Signed and Sealed this

Ninth Day of November 1976

[SEAL]

Attest:

RUTH C. MASON
*Attesting Officer*

C. MARSHALL DANN
*Commissioner of Patents and Trademarks*